United States Patent [19]

Lundahl et al.

[11] Patent Number: 4,951,452
[45] Date of Patent: Aug. 28, 1990

[54] LARGE BALE HAY BALER

[75] Inventors: E. Cordell Lundahl, Providence; J. Gordon Wiser, Logan; Laurel H. Jensen, Hyrum; Ernie Vandenwijengeart, Logan, all of Utah

[73] Assignee: Ezra C. Lundahl, Inc., Logan, Utah

[21] Appl. No.: 364,968

[22] Filed: Jun. 9, 1989

[51] Int. Cl.⁵ .............................................. A01D 39/00
[52] U.S. Cl. ........................................ 56/341; 56/343; 56/435; 100/98 A
[58] Field of Search .................. 56/341, 343, 434, 435, 56/437, 438, 439, 447, DIG. 8, 130; 100/88, 98 A

[56]         References Cited
         U.S. PATENT DOCUMENTS
    3,022,723  2/1962  Templeton ...................... 100/98 A 4,193,251  3/1980  Oosterling et al. .................... 56/341
    4,202,262  5/1980  Claas et al. ............................. 56/341
    4,850,271  7/1989  White et al. ........................... 56/341

FOREIGN PATENT DOCUMENTS
    2224288 10/1974 France ................................. 56/341

Primary Examiner—Stephen J. Novosad
Assistant Examiner—Terry Lee Melius
Attorney, Agent, or Firm—Henderson & Sturm

[57]           ABSTRACT

A hay baler including a trailer frame with a hitch for attachment to a prime mover and support wheels. A crop pick-up unit moves cut crop into a material storage area, from where it is moved into a bale chamber and is compacted by a compression unit and tied with twine before being discharged to ground from the rear of the trailer frame.

29 Claims, 3 Drawing Sheets

LARGE BALE HAY BALER

Field of the Invention

1. Field of the Invention

This invention relates to hay balers and is particularly concerned with hay balers that will produce large bales that are to be machine handled.

2. Prior Art

Hay balers have long been known and used. Generally the hay balers with which we are familiar have produced small, compacted bales that can be manually handled. Other known balers will produce large rolls of hay that are tied and that then must be manipulated using forklifts or other suitable machines.

There have heretofore been available balers that will produce large bales, i.e., in the nature of four foot cubes that are firmly compacted bales and then tied, and that can be readily stacked, moved or otherwise handled using conventional forklifts or other suitable machines. These known balers are made extremely large and heavy in order to provide multi-face squeezing units that will compact the hay and utilize tine pick-up and, delivery systems. Such known large bale balers must be pulled and powered by large prime movers.

SUMMARY OF THE INVENTION

Objects of the Invention

Principal objects of the present invention are to provide a baler that can be pulled by conventional smaller prime movers; that will pick-up cut crop with a pneumatic brush or an auger pick-up; deliver the crop using an air delivery system; and that will compact the crop to a desired density into large airated bales, tie the bales and discharge the large, tied bales.

Features of the Invention

Principal features of the invention include a cut crop pick-up unit including a pressurized air movement system having a continuously flaring delivery tube; an accumulator in which collected crop is stored; a compaction chamber receiving crop from the accumulator; a compression unit to compress material in the compaction chamber and to move it into a bale chamber where it is compressed to bale shape at user selected density and is tied while under full compression; a tailgate that serves as a compression wall of the bale chamber and as a discharge platform; and discharge means for moving the bale from the discharge platform while the baler continues to travel and is forming the next untied bale.

An electronic sensing system determines the rate of flow through the delivery tube and indicates to the operator whether or not the speed of operation should be changed to insure optimum pick-up. The operator is also able to direct air flow for maximum pick-up and lifting action of the crop as necessary.

Pressure sensors are used to determine and control bale compactness, and sensors are used to determine the pressures of crop in the compaction chamber. During compaction the pressure head is operated so that spikes thereon will form holes in the bale to facilitate bale drying and handling. A single ram system incorporating a two speed travel rate is used to initially and finally compact the hay of the bale.

The tailgate may be made movable with respect to the bale chamber to permit the size of the bale formed to be varied.

Other objects and features of the invention will become apparent from the following detailed description and drawings disclosing what are presently contemplated as being the best modes of the invention.

THE DRAWINGS

In the drawings:

FIG. 4, a schematic diagram of the hydraulic system of the baler;

DETAILED DESCRIPTION

Referring now to the drawings:

The hay baler 10 of the present invention includes a trailer frame, shown generally at 11 and having side rails 12, interconnection rails 13, a tongue 14, and a trailer hitch 15. Tandom wheels 16 support the trailer frame, in conventional fashion.

The baler 10 also includes a crop pick-up unit shown generally at 18. The continuously flared conveyor 18 delivers cut crop to an accumulator chamber 19 and the accumulator chamber opens into a compaction chamber 20. A compression unit 21 is mounted to extend into the compaction chamber 20 and to force compacted material into a bale chamber 22. A tailgate 23 is adapted to provide a pressure reactor wall for the bale chamber and will open to permit discharge of compacted and tied bales formed in the bale chamber, as will be further disclosed.

Power is transmitted to the hay baler from the prime mover through the power take-off drive shaft 31 and through a gear box 32 to a cross shaft 33 and a drive pulley 34. Power is also transmitted from a pulley 35 on Cross shaft 33. A belt 36 interconnects the pulley 34 and a pulley 37 on a shaft 38. A belt 39 interconnects the pulley 35 and a pulley 40 on a shaft 41. Shaft 41 is supported on one of the ends of pivot arm 42, the other ends of which are journalled around cross shaft 33 and at opposite sides of the machine. Shaft 41 can then swing up and down in an arc around shaft 33 without altering the tension on the belt 39. A belt 39a from pulley 40 to pulley 44b provides power to pick-up auger 43. Both shafts 41 and 44 are fixed to the same member so that belt 39d does not change length. A pick-up brush or pick-up auger 43 is mounted on a shaft 44 and the position of the pick-up brush or pick-up auger 43 above the ground is adjusted by changing the position of roller 44a by an adjustable bracket 44c. Arms 42 and 47 from a parallel link to maintain proper orientation at the pick-up brush or auger and the roller to the ground and air delivery system. A hydraulic cylinder 45 having one end pivotally connected to the trailer frame and its other end pivotally connected to the pick-up assembly shown generally at 17 is used to position the shaft 44, arms 42 and the pick-up brushes or auger. A pair of blowers 49 and 50 are operated by turning of shaft 38.

The air from blowers 49 and 50 is forced down an air duct 51 and through a flexible boot section 51a of the duct and section of duct 51b that is movable and that is carried by arms 42 before being deflected past brush or auger 43 and then upwardly into another air duct shown generally at 52, by an air baffle shown generally at 53. Arm 47 is pivotally connected to the trailer frame at 48 and to the movable section of duct 51b at 48a. Duct section 51b is made to telescope with respect to duct 52 during movement of arms 42 and 47 and the flexible boot section accommodates such movements. An air baffle connected to handle 53 is manually adjustable to increase or decrease the intensity of the low pressure area by the pick-up brush or auger which is produced by venturi action from the air flow. The baffle at handle 53 is preferably manually positioned prior to use of the baler, in accordance with the type crop being baled.

As the baler is pulled by a prime mover, pick-up brush or auger 43 rotates in a direction opposite to the rotation of wheels 16 to sweep cut crop or other material from the ground. The air stream from the blowers 49 and 50, if so directed by baffle connected to handle 53 creates a low pressure to draw the cut crop into the air stream which then carries the material from the brush into and through air duct 52 to the accumulator 19 or the compaction chamber 20. If a press head 60 of the compression unit 21 is in a retracted position (as shown in solid lines in FIG. 1 and 2), the material will flow through the accumulator chamber 19 and into the compaction chamber 20. When the compaction chamber 20 is filled the material will fill the accumulator. To insure free flow of air and entrained cut crop from the brush or auger 43 through the air tube 52 and into the accumulator chamber 19 and the compaction chamber 20, the cross sectional area of each portion continually increases along the traveled route. That is, the transition from the tube 52 to the top of the accumulator 19 is flared to have a continuously larger cross section, and the sides of the accumulator chamber flare to meet the larger opening area of the compaction chamber. The sides and floor 55 of the compaction chamber and the top section 52d of tube 52c, are air venting material This is to allow the conveying air to escape. The walls of the accumulator are made solid so that air introduced into the top thereof will act on cut crop collected therein to apply a compacting pressure.

Equal loading of the compaction chamber is accomplished by allowing air to escape from different areas through the vents 55. This moves the cut crop into areas of the chamber that are not otherwise evenly loaded. As the air escapes the entrained crop is moved to the area having the escape vent.

Figure 5:
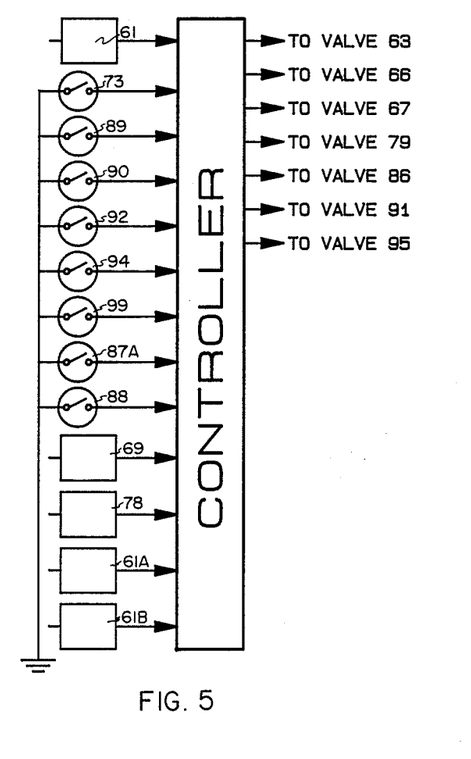
FIG. 5, a schematic diagram of the pressure control system.

A sensor 61 (FIGS. 1 and 5), generates a beam above the top of the compaction chamber 20. As material enters the compaction chamber the beam is intermittently broken by the material.

Figure 1:
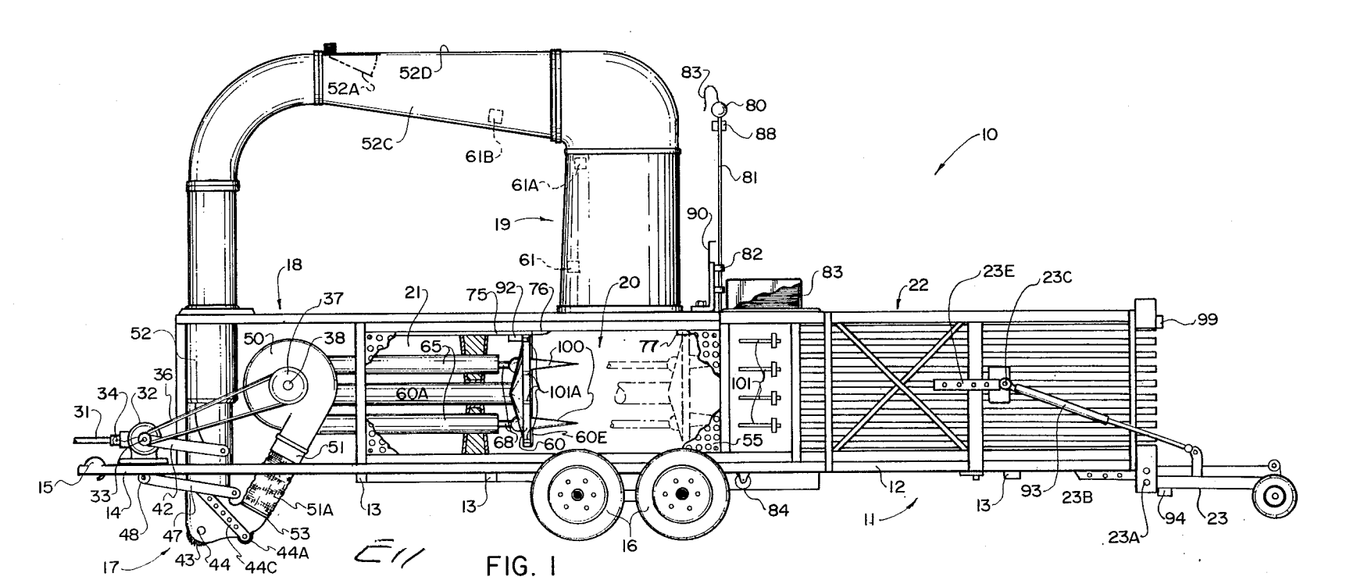
FIG. 1, is an elevation view of one side of a hay baler of the invention partially cut away to show interior components.
Figure 2:
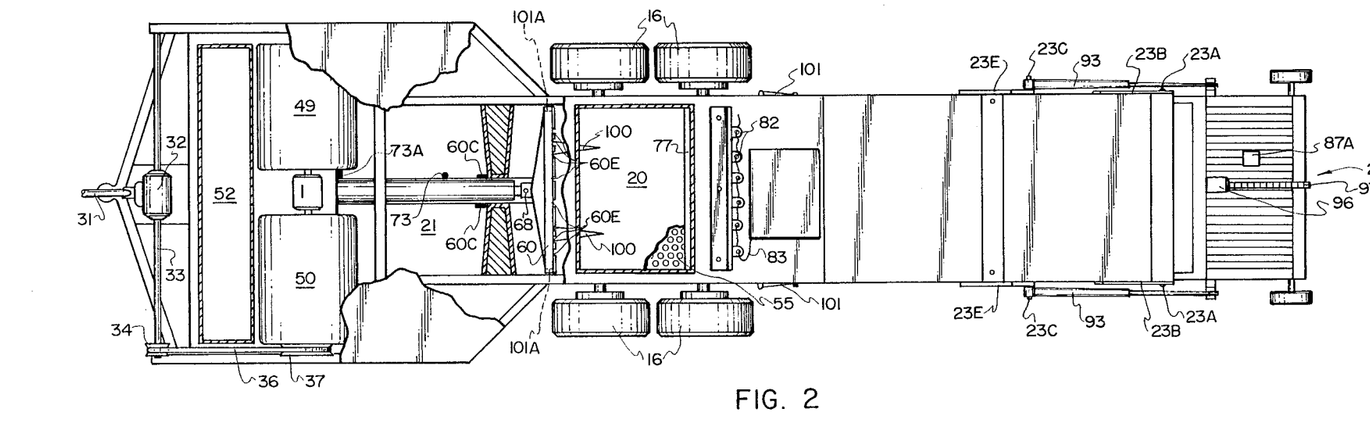
FIG. 2, a top plan view, partially cut-away to show interior components.
Figure 3:
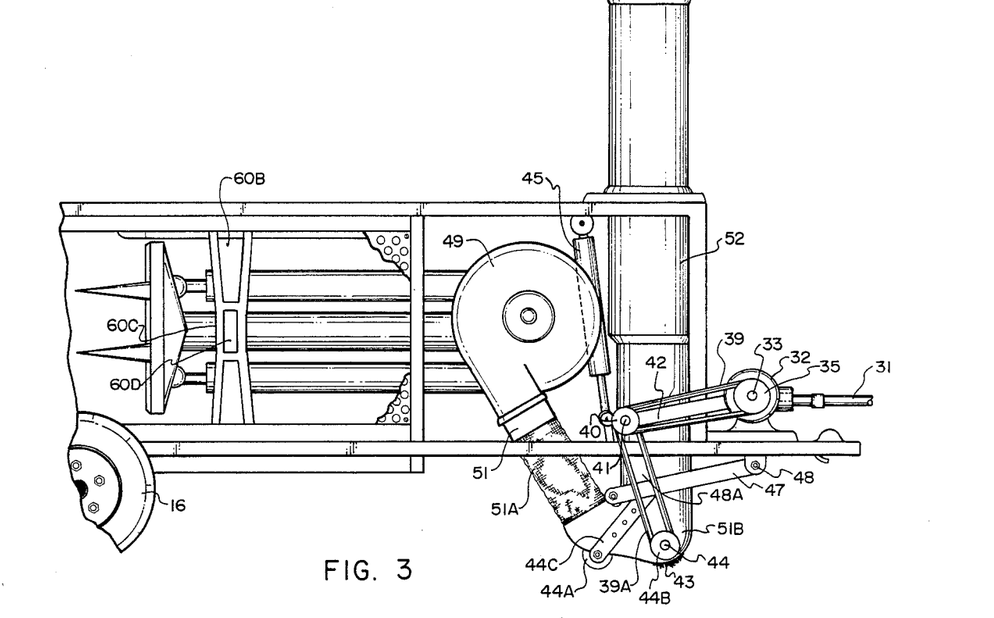
FIG. 3, a view like FIG. 1, of a portion of the opposite side of the baler.

When the compaction chamber 20 is full, the output of sensor 61 is sent to a controller 62 which determines when the output from sensor 61 has been continuously interrupted for a predetermined time period, for example one and one-half seconds. When the output from sensor 61 has been in its changed state for the predetermined period the controller 62 energizes a solenoid controlled hydraulic reversing valve 63 (FIG. 4) to press position. In the press position valve 63 opens and allows hydraulic fluid to flow from a hydraulic pump 64 through valve 63 to the large area end of a hydraulic cylinder 65. At the same time a solenoid operated hydraulic valve 66 is opened and solenoid operated hydraulic valve 67 is closed so that fluid will flow into the opposite end of cylinder 65. With the same pressure at both ends of cylinder 65 and the pressure acting against different sized areas the "large area end" and "the small area end" having areas that differ by an amount equal to the cross sectional area of cylinder rod 68, the cylinder rod 68 will be expelled and move in the direction indicated as PRESS in FIG. 4. As the rod 68 moves, fluid is forced out of the small area end of cylinder 65, through a valve 66, and into the large area end of cylinder 65. Only a small portion of the fluid entering the large area end of cylinder 65 comes from pump 64 so the rod 68 then moves rapidly to give a "fast press" portion of the stroke. The velocity of the rod is determined by the rate of fluid flowing from the pump 64 in gpm divided by the gallons displaced by the movement of head 60, at the rod 68, i.e., "the small area end". Rod 68 pushes press head 60 against the material in the compaction chamber 20. During "fast press" the amount of force applied to the press head 60 in pounds, is the pressure in psi in cylinder 65 multiplied by the cross sectional area of the rod in square inches. The pressure on the material in the press chamber is the force applied by rod 68 divided by the cross sectional area of the press head 60. As the material is compressed the reactive pressure of the material against the press head increases so that a continually greater force application is required if the rod 68 is to continue to further compress the material. As shown in FIGS. 1 and 2, a pair of cylinders 65 are used in tandem to drive the press head 60, which is guided by a guide tube 60a, guide tube 60a reciprocated through a spider 60b, the legs of which are fixed to trailer frame 12. Rollers 60c project into a yoke 60d of the spider to engage tube 60c and to permit free reciprocation of the guide tube. The guide tube then holds the press head in proper orientation, even if the tandem cylinders 65 apply different forces to the press head. For ease of explanation, reference has been and will be made to "a cylinder 65", since a single cylinder can be used and it will be understood that such references encompass a tandem arrangement of multiple cylinders, as well.

The pressure in cylinder 65 is monitored by a pressure sensor 69. If the pressure in cylinder 65 increases to a pre-set amount before the material is completely pressed into the bale chamber, the pressure sensor 69 sends an output to the controller 62. The pre-set pressure is set just below the bypass pressure of the system. The pre-set pressure represents a limit pressure which allows operation near the system capacity, without exceeding it. When the controller 62 receives an electrical signal from sensor 69 the controller energizes the solenoid operated hydraulic control valves 66 and 67 to turn the valve 66 to a no-flow condition and valve 67 to a flow-through condition. In this condition the fluid from a small area end of cylinder 65 does not flow into the large area end of cylinder 65, but goes directly through valve 67 to a hydraulic fluid supply tank 71. In this case, the velocity of rod 68 is determined by the flow of the fluid from pump 64, in gpm, divided by the gallons required to move rod 68 per inch. This velocity is much slower than the velocity achieved just prior to reaching the pressure limit, but the force applied to rod 68 is greater, with less fluid pressure. This is referred to as the full press portion of the stroke. The force on the rod is the fluid pressure in the cylinder multiplied by the cross sectional area of the cylinder. This mode of operation is needed only for the last travel length of those strokes of the press head 60 immediately before full compaction is achieved. In a cycle of operation, the press head 60 will be initially travelled under fast press conditions, but a last position of press head travel during each strokes after initial pressure compaction is achieved will be under full press conditions. This can be achieved since the bale is not held against moving by pressure on its sides, as in a conventional baler where the bale moves under full pressure on each press stroke, but rather, because the bale is pressed against the tailgate 23 so that the final pressure applied to the bale is the pressure applied by the pressure set for the last stroke only. By controlling the pressure of the last stroke the bale density can be carefully controlled. Consequently, a constant bale density and a fixed bale length can both be achieved. With this baler, both the bale density and length may be adjusted. The bale length is adjusted by varying the length of the bale chamber 22. This is accomplished by changing the position of the tailgate 23. For this purpose the pivot axes 23a of the tailgate are adjustably positioned in a pair of guides 23b at opposite sides of the unit. Also pivot pins 23c for hydraulic cylinders 93 that operate the tailgate are adjustable along supports 23e carried by the trailer frame. When the press head 60 reaches the end of its stroke, in either the fast press or full press portion of the stroke, a limit switch 73 (FIG. 2) is activated by a tab 73a of guide tube 60a. Limit switch 73 sends a signal to the controller 62 which, in turn, de-energizes solenoid valve 67, to an open flow condition, and valve 66 to a no-flow condition and switches solenoid valve 63 from the press position to the return position. The press head, moving forward, retracts rod 68 into cylinder 65. As rod 68 moves into cylinder 65 the hydraulic fluid is pushed out of the large area end of cylinder 65. The fluid then flows back through the line marked 'PRESS' on FIG. 4, through valve 63 to a port R of valve 63 and then to the supply tank 71. Oil from the P side of valve 63 flows to the return port through valve 67 to the small area end of the cylinder. While the press head 60 is pressing, either in the fast or full press portion of the stroke, cut material is prevented from falling behind the press head from the accumulator chamber 19 by an accumulator bottom 75 that is attached to and movable with the press head. When the press head approaches the end of the press stroke, i.e., the dotted line position of FIG. 1, a cutting edge 76, mounted across the leading edge of the press head, shears against a cutting edge 77, forming an edge across the top of the back of the press chamber, and separates the material in the compaction chamber 20 from the material in the accumulator chamber 19. When the press head 60 is returning to the forward or fill position controller 62 monitor sensor, 61a for an interrupted signal. Sensor 61a monitors material in the top of the accumulator chamber. If the material interrupts the beam continuously, then the controller changes from return cycle to fast press without monitoring sensor 61. In doing so, minimum cycle time is achieved between return and fast press, do to the accumulator chamber being full. Sensor 61b of tube 52c monitors the horizontal portion of the air delivery system. When this sensor is interrupted, a signal is given to the operator to slow the pick-up rate to prevent plugging. Sensor 61b also signals controller 62 which then opens a flap 52a to redirect air to strike between tube 52c to clear material from the horizontal air delivery tube. When the press head returns to the forward or fill position the material collected in the accumulator chamber is forced downward in to the compaction chamber by the force of the compressed air and gravity.

While the press head 60 is compressing material in the full press portion of the press stroke the hydraulic fluid pressure in the large area end of cylinder 65 is also monitored by an adjustable pressure sensor 78. When the pressure reaches a pre-set amount, sensor 78 sends an output signal to controller 62. Any given fluid pressure in cylinder 65 represents a corresponding force on the press head, a corresponding pressure on the material in the bale, and hence a corresponding density of material in the bale for any particular type of material. The setting on sensor 78 then becomes the bale density adjustment. The output from sensor 78, showing that desired compaction has been achieved, while the system is in the full press portion of the stroke, is a signal to the controller 62 that tying must be effected at the end of the present stroke. When the press head 60 reaches the end of the full press portion of the press stroke, limit switch 73, FIG. 2, is activated. Limit switch 73 sends a signal to controller 62. Controller 62 having already received an output from sensor 78, while the system was in the full press portion of the press stroke, upon receipt of the signal from switch 73 de-energizes valve 63. With valve 63 de-energized, the hydraulic fluid is trapped in the large area end of cylinder 65 so that rod 68 cannot move. The press head stops at the extreme position of the press stroke rather than returning to the fill position, as it does when the controller 62 does not receive an input from sensor 78 prior to receiving input from limit switch 73. In this position, the press head maintains full pressure on the bale during tying. The controller 62 energizes a hydraulic reversing valve 79 in a down position. Valve 79, when energized, allows hydraulic fluid to flow from hydraulic pump 64 through a hydraulic motor 80 (or cylinder) to drive six straight needles 81 down through a needle guide 82 and through clearance grooves 60e in the press head 60. Twine 83 is carried by the needles down and across the end of the bale to the knotters 84 located under the end of the bale. When the needles 81 reach a correct position adjacent to the knotter 84, a limit switch 90 (FIG. 5) is activated to send a signal to the controller 62 that will de-energize valve 79 and energize valve 86. With valve 79 de-energized motor or cylinder 80, stops and the needles are stopped in a correct position. With valve 86 energized the knotter motor 87 starts. Knotter motor 87 turns a shaft 88a to rotate the knotters 84 through one cycle. When the knotters have turned through one cycle a limit switch 89 closes momentarily and sends a signal to controller 62. The controller de-energizes valve 86 and energizes valve 79 in an up position. With valve 86 de-energized, motor 87, shaft 88 and knotters 84 will stop. Twine will be captured by the knotters to wrap around the new forming bale.

With valve 79 energized in the up position, hydraulic fluid from pump 64 is allowed to flow to motor 80, which drives needles 81 to the up position. When the needles reach the up position a limit switch 88 is energized to send an output to controller 62, which de-energized valves 79 and energizes valve 63 in a return position and a valve 95 in a down position. With valve 79 de-energized motor or cylinder 80 stops and holds the needles 81 in their up position, ready for the next bale to be tied. When valve 86 is de-energized and valve 63 is energized in a return position cylinder 65 drives the press head to the fill position, as previously described. When the press head 60 is returned to its fill position a limit switch 92 is energized to send a signal to controller 62, which then de-energizes valve 63 and holds the press head 60 in the fill position. The press head will remain in the fill position until sensor 61 sends another signal to controller 62 or unless sensor 61a has sent a signal to the controller as previously described.

With valve 95 in the down position hydraulic fluid is allowed to flow into the large area ends of cylinders 93 to drive the tailgate 23 to its down, or open position. When the tailgate reaches the open position limit switch 94 is activated. Switch 94 sends an output to controller 62 which de-energizes valve 95 to trap the fluid in cylinders 93 and hold the tailgate in its open position. With the tailgate open, the bale will move toward the opening each time new material is forced from the compaction chamber 19 into the bale chamber 22. The amount the bale moves as a result of each press is a determinedly variable amount, that will depend on the material being baled, since the press chamber is completely full before each press. As the bale moves out it cocks a gate limit switch 87a which sends a signal to controller 62, but this signal does not cause the controller to react.

Controller 62 is responsive to release of the sensing switch 87a. After each bale achieves the desired compactness, it is tied and is essentially moved out of the bale chamber, the controller 62 energizes valve 91, which allows fluid to flow from pump 64 to a hydraulic motor 96 to drive an unloading chain 97 that will carry the bale fully out of the bale chamber across the tailgate to discharge. As the bale drops from the tailgate the gate limit switch 87a is activated to send a signal to controller 62, which then de-energizes valve 91, and energizes valve 95 in the closed position. Valve 95 allows fluid from pump 64 to flow into the small area ends of cylinders 93 and to thus drive the tailgate to its up or closed position. When the tailgate reaches the closed position a limit switch 99 is activated to send a signal to controller 62, which de-energizes valve 95 and traps the fluid in cylinders 93 to hold the tailgate in its closed position during the final press cycles of a new bale.

One or more spikes 100, are preferably mounted on the press head 60 to punch low density passageways through the length of each bale, so that air will circulate to increase drying of the baled material.

Spring loaded holding "dogs" 101, which move out of the chamber while material is being compressed and that move in to hold the material in place when the press head moves away from the bale, are located at both sides of the entrance to bale chamber 22. Grooves 101a in press head 60 allows the holding dogs to move in to hold said material as press head reaches its full press position thereby prevent reverse travel of compressed material.

Figure 6:
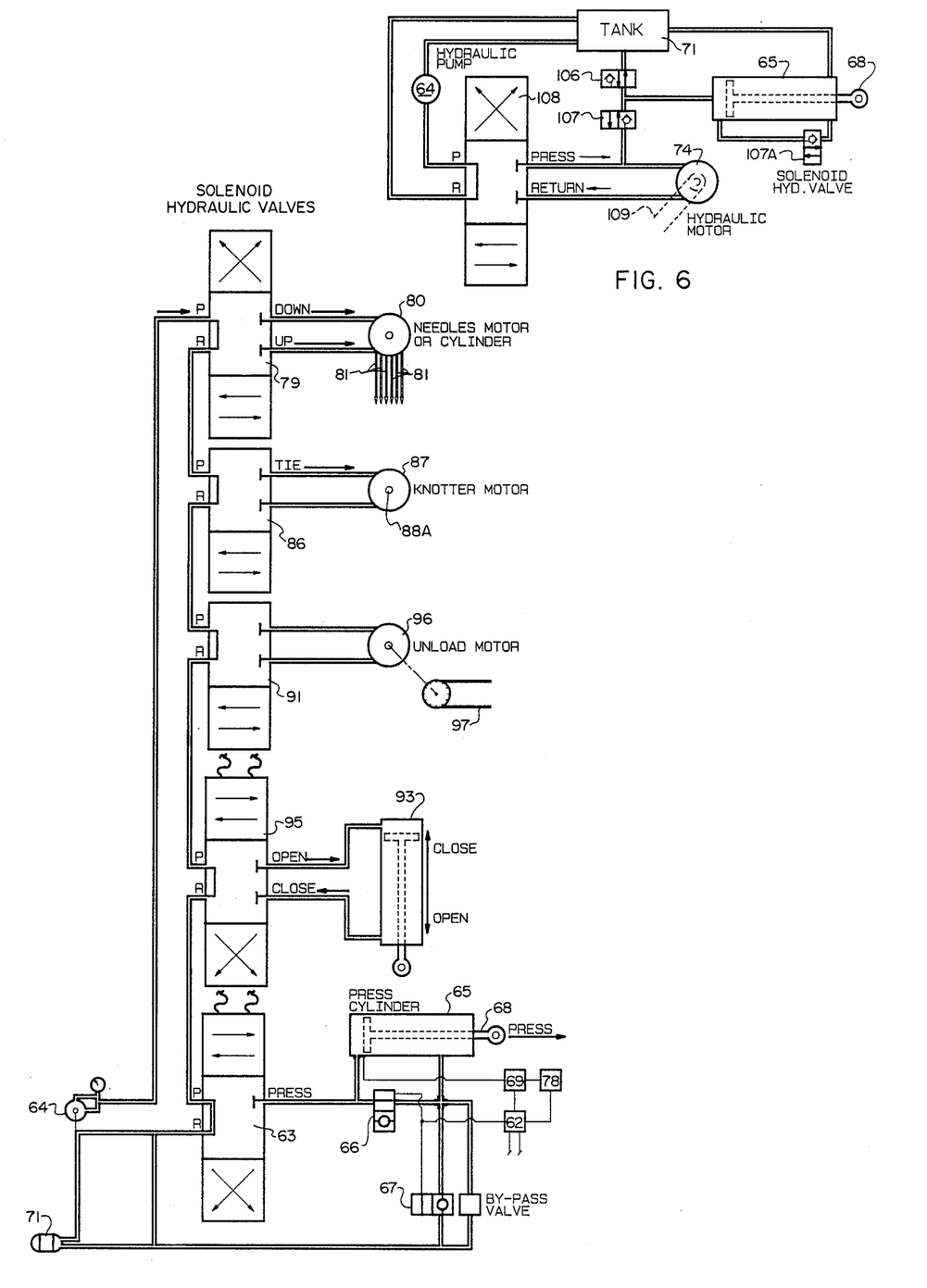
FIG. 6, a schematic diagram of another embodiment of hydraulic system of the baler.

A schematic of an optional hydraulic system for controlling the press and return strokes of the press head 60 is shown in FIG. 6. In this system valves 106 and 107 are shown for the return stroke and the fast press portion of the press stroke. Hydraulic motor 74 drives a chain 109 to which the press head 60 is attached. The press head is thus driven by movement of chain 109 in either a forward or reverse direction. Valves 106, 107 and a valve 108 are controlled in the same manner as the valves previously described. In this embodiment, however, fluid is circulated as follows:

For the Fast Press—fluid from hydraulic pump 64 flows through valve 108, motor 74, and back to the tank 71. The motor drives the press head and the press head pulls on rod 68, which draws fluid through valve 106 into the large area end of cylinder 65. Valve 106 is seleCted to accommodate a large amount of fluid flow as the fluid from cylinder 65 is drawn out very rapidly. Valve 107a allows fluid to flow from the rod end of cylinder 65 to the large end at cylinder 65 when the motor 74 is used to move the press head 60.

For the Full Press—valves 106 and 107 are switched from the position shown in FIG. 6, and fluid from valve 108 flows through valve 107 to the large area end of cylinder 65. Valve 107a is closed. The fluid is blocked from returning to the tank by valve 106. A small amount of fluid continues to flow through motor 74. Both motor 74 and cylinder 65 drive the press head in this mode, to full press head pressure.

For Return—valves 106, 107, 107a and 108 as shown in FIG. 6, are energized so that the fluid flows to the motor to drive the press head in the opposite direction, i.e., toward the fill position. The press head pushes on rod 68 which pushes the fluid from cylinder 65 back through valve 106 to the tank. Some oil will also flow through valves 107 and 108 to the tank. Some oil will flow from the large area end at cylinder 65 through valve 107a to the rod end at cylinder 65.

With the baler of the present invention, cut crop is picked up and efficiently delivered to an accumulator chamber, and then to a compaction chamber and discharged.

The compaction of the material is against a tailgate and the degree of compaction is determined and set by an operator of the machine.

The compacted material is tied using straight needles that easily pass through slots in a compacting press head and knotters and as each bale is discharged, a next following bale is initially formed against the preceeding bale as the previously formed bale is discharged and the tailgate closes. The final forming and compaction of the bale is made against the tailgate.

A two speed compaction system insures rapid compaction while still providing for uniform controlled maximum compaction for a bale.

Although preferred forms of our invention have been herein disclosed, it is to be understood that the present disclosure is by way of example and that variations are possible without departing from the subject matter coming within the scope of the following claims, which subject matter we regard as our invention.

We claim:

1. A large hay baler comprising:
   a vehicle frame;
   means on said vehicle frame defining an accumulator chamber, a compaction chamber connected to said accumulator chamber, a bale chamber connected to said accumulator chamber and having a tailgate carried by the frame and positioned at the end of the bale chamber;
   means for picking up cut crop and for delivering said cut crop into the accumulator chamber;
   means for selectively transferring material from said accumulator chamber to said compaction chamber;
   means for compacting material in the compaction chamber;
   ram means for moving said compacted material in said compaction chamber into the bale chamber thereby compressing said compacted material at a first rate;
   said ram means further compressing at a second and slower rate and to a greater degree said compressed material in said bale chamber;

means for tying said compressed material int eh bale chamber when compressed to a desired density into a bale; and means for opening the tailgate to release the compacted and tied bale.

2. A large bale hay baler as in claim 1, wherein the means for picking up cut crop and for delivering the said crop into the accumulator chamber includes blower means carried by said vehicle frame;

rotating pick-up means carried by the frame and engaging cut crop to lift the crop from the ground; and duct means extending from the pick-up means to the accumulator chamber receiving air from the blower means and cut crop from the pick-up means control means for providing.

3. A large bale hay baler as in claim 2, wherein the duct means is continually enlarging in cross section from the pick-up means to the accumulator chamber.

4. A large bale hay baler as in claim 3, wherein the rotating pick-up means is mounted for rotation in a portion of the duct means; and further including support arms pivoted to the vehicle frame and supporting a portion of duct means and the rotating pick-up means; and means for pivoting the support portion of the duct means supported by said arms and said rotating pick up means between a raised and a lowered position.

5. A large bale hay baler as in claim 3, wherein the ram means for compacting material in the compaction chamber includes;

a press head;

cylinder means including a rod fixed to the press head; and means for operating the cylinder means to reciprocate the press head into and out of the compaction chamber control means for providing at least two speeds and corresponding different pressures for the cylinder.

6. A large bale hay baler as in claim 5, further including means carried by the press head for closing off flow of cut crop from the accumulator chamber to the compaction chamber when the press head is reciprocated within the bale chamber.

7. A large bale hay baler as in claim 6, further including shear means on press head; and cooperating shear means carried by the vehicle frame at the inlet to the compaction chamber, whereby the shear means cuts through material located between the accumulator and compaction chambers upon movement of the press head through the compaction chamber.

8. A large bale hay baler as in claim 5, further including at least one spike projecting from the press head to penetrate material being compacted by the press head.

9. A large bale hay baler as in claim 5, wherein said control means index control means for operating the cylinder means to move the press head into the compaction chamber at first fast speed until a predetermined compaction of material in the bale chamber is reached and to thereafter continue movement of the pressure head into the bale chamber at a slower speed and greater pressure until a desired maximum compaction of the material is achieved.

10. A large bale hay baler as in claim 9, further including means carried by walls of the bale chamber to prevent reverse travel of material compacted therein.

11. A large bale hay baler as in claim 10, further including means including slots in the press head which allow the means carried by the walls of the bale chamber to prevent reverse travel of material compacted therein to move in and to hold said material when the press head reaches maximum press head travel.

12. A large bale hay baler as in claim 11, wherein the means carried by walls of the bale chamber to prevent reverse travel of material compacted therein comprise spring loaded dogs extending into the bale chamber and opening to permit material to move into the bale chamber but closing to prevent movement of said material out of said bale chamber to thereby allow complete and uniform filling of said bale chamber.

13. A large bale hay baler as in claim 12, further including means for moving formed and tied bales across the tailgate to discharge, while another bale is being formed.

14. A large bale hay baler as in claim 13, further including means for closing the tailgate after discharge of a tied bale thereacross.

15. A large bale hay baler as in claim 13, further including means to adjustably position the tailgate relative to the bale chamber to thereby change the length of a formed bale.

16. A large bale hay baler as in claim 14, wherein the means for tying the material compacted in the bale chamber to a desired density includes a plurality of straight knotter needles carried by the vehicle frame above the bale chamber;

grooves in the press head for needle to reciprocate into and out of while bale is under full compression; and a knotter for each needle positioned beneath the bale chamber and adapted to tie strings moved to the knotters by the needles.

17. A large bale hay baler as in claim 1, wherein the means for tying the material compacted in the bale chamber to a desired density includes a plurality of straight needles carried by the vehicle frame above the bale chamber;

a groove for each needle on a face of the press head;

means for operating said needles to move the tips thereof through said grooves when material in the compaction chamber has reached a predetermined degree of compaction;

knotter means to cooperate with said needles and strings carried by said needles around material in the bale chamber;

means to withdraw said needles from said grooves after tying of the strings; and means for leaving the strings in a position to wrap around a new forming bale.

18. A large bale hay baler as in claim 17, further including means carried by walls of the bale chamber to prevent reverse travel of material compacted therein.

19. A large bale hay baler as in claim 18, wherein the means carried by walls of the bale chamber to prevent reverse travel of material compacted therein comprise spring loaded dogs extending into the compaction chamber and opening to permit material to move into the bale chamber but closing to prevent movement of said material out of said bale chamber.

20. A large bale hay baler as in claim 19, further including
means for moving formed and tied bales across the tailgate to discharge.

21. A large bale hay baler as in claim 20, further including
means for closing the tailgate after discharge of a bale thereacross.

22. A large bale hay baler as in claim 21, further including
means to adjustably position the tailgate relative to the bale chamber to thereby change the length of the bale formed.

23. A large bale hay baler as in claim 21, further including
control means to regulate the pressure applied by the ram means and thereby control the density of the bale formed.

24. A large bale hay baler as in claim 23, further including
means for uniformly filling the bale chamber by exhausting air from the air delivery system to low density areas of material in the said bale chamber.

25. A large bale hay baler as in claim 24, further including
means for applying downward air pressure to material contained in the said accumulator chamber during the press cycle, to provide rapid delivery of material to the bale chamber following the press cycle.

26. A large bale hay baler as in claim 25, further including means located ahead of the accumulator chamber for exhausting excessive air from the air delivery during press cycles.

27. A large bale hay baler as in claim 26, further including
means for determining when the said bale chamber is full and for initiating a press stroke by the ram means only when the bale chamber is full.

28. A large bale hay baler as in claim 27, further including
means for informing the operator that the vehicle is travelling too fast for maximum pick-up of material.

29. A large bale hay baler as in claim 28, further including
means for redirecting air from the air delivery system to clear the lower portion of the horizontal part of the air delivery tube, when said tube is excessively filled.

* * * * *

UNITED STATES PATENT AND TRADEMARK OFFICE
CERTIFICATE OF CORRECTION

PATENT NO. : 4,951,452

DATED : August 28, 1990

INVENTOR(S) : E. Cordell Lundahl, J. Gordon. Wiser, Laurel H. Jensen, and Ernie Vandenwijngeart It is certified that error appears in the above-identified patent and that said Letters Patent is hereby corrected as shown below:

At Column 7, Line 68, "seleCted" should read --selected--. At Column 9, Line 1, "int eh" should read --in the--; at Line 16, "control means for providing" should be deleted; at Line 50, insert --the-- before "press"; at Line 63, "index" should read --includes--; at Line 64, "control" should be deleted. At Column 10, Line 51, "bale" should read --compaction--; at Line 54, "bale" should read --compaction--. At Column 11, Line 1, "bale" should read --compaction--; at Lines 4, 8 and 9, "bale" should read --compaction--. At Column 12, Line 1, "bale" should read --compaction--; at Line 2, "the" should read --an--; at Line 3, "bale" should read --compaction--; at Line 9, "bale" should read --compaction--; at Line 17, "bale" should read --compaction--; at Line 19, "bale" should read --compaction--.

Signed and Sealed this

Fourteenth Day of January, 1992

Attest:

HARRY F. MANBECK, JR.

*Attesting Officer*      *Commissioner of Patents and Trademarks*